United States Patent [19]

Arimoto

[11] Patent Number: 4,580,187
[45] Date of Patent: Apr. 1, 1986

[54] A-C CURRENT LIMITING DEVICE

[75] Inventor: Satomi Arimoto, Nishinomiya, Japan

[73] Assignee: Mitsubishi Denki Kabushiki Kaisha, Tokyo, Japan

[21] Appl. No.: 592,361

[22] Filed: Mar. 22, 1984

[30] Foreign Application Priority Data

Mar. 31, 1983 [JP] Japan .................................. 58-58205

[51] Int. Cl.⁴ ............................................. H02H 9/02
[52] U.S. Cl. ..................................... 361/58; 361/113; 307/51
[58] Field of Search ................... 361/58, 43, 111, 110, 361/113, 10, 11, 63; 323/276, 908, 299, 301, 355, 362; 333/12 R, 17 L, 13, 17 M, 17 R; 307/20, 51

[56] References Cited

U.S. PATENT DOCUMENTS

| 3,745,416 | 7/1973 | Thanawala | 361/58 |
| 4,158,864 | 6/1979 | Kennon | 361/58 |
| 4,165,527 | 8/1979 | Paice | 361/58 X |
| 4,523,249 | 6/1985 | Arimoto | 361/58 |

FOREIGN PATENT DOCUMENTS 56-81045  11/1979  Japan .

Primary Examiner—Patrick R. Salce
Attorney, Agent, or Firm—Leydig, Voit & Mayer Ltd.

[57] ABSTRACT

A current limiting device has a reactor including an intermediate terminal, a capacitor connected in series between one external terminal of said reactor and said intermediate terminal of said reactor and a closing means as well as a resistor, wherein the other external terminal of said reactor and the connection terminal of said capacitor and said closing means are respectively connected to different A-C systems.

7 Claims, 4 Drawing Figures

A-C CURRENT LIMITING DEVICE

BACKGROUND OF THE INVENTION

The present invention relates to an A-C current limiting device (hereinafter simply referred to as current limiting device) for limiting transient defective current that flow when a line is grounded or is short-circuited in an electric power system such as A-C lines or A-C transmission lines, or among different electric power systems.

A conventional device of this type proposed so far is as shown in FIG. 1, in which a current limiting device 1 is inserted for one phase between coupling points a, b of two systems $S_1$ and $S_2$. A reactor 11 and a capacitor 12 are connected in series to form a first circuit, and a reactor 11A and resistors 14, 14A are connected in series to form a second circuit. The first and second circuits are connected in parallel. A closing means 13 consisting of a gap, contact elements, semiconductor elements or non-linear elements, is inserted between a connection point d of reactor 11 and the capacitor 12 of the first circuit, and a connection point c of the resistors 14 and 14A of the second circuit. The closing means 13 is in an open state under normal conditions and only conducts when an applied voltage thereacross exceeds a predetermined voltage.

The thus constructed device of FIG. 1 operates as described herebelow.

Under ordinary condition, the systems $S_1$ and $S_2$ have nearly the same potential, and the potential difference is small across the connection points c and d. Therefore, the closing device 13 remains open, and a series resonance circuit is formed by the reactor 11 and the capacitor 12 to establish resonance operation for the A-C frequency in the system. Under this condition, the systems $S_1$, $S_2$ have impedances close to zero and are coupled together through the first circuit.

On the other hand, in case an accident has developed, a heavy transient current flows through the systems $S_1$, $S_2$ and the potential difference increases suddenly across the connection points c and d. The closing device 13 therefore works to short-circuit the connection points c and d, whereby a parallel resonance circuit is formed by the capacitor 12 of the first circuit and the reactor 11A of the second circuit. Namely, the systems $S_1$, $S_2$ are coupled together through a large impedance (particularly, the impedance increases infinitely if the resistance of resistor 14A is zero), and an excess current flowing between the systems $S_1$ and $S_2$ is limited. If the resistor 14A has a resistance which is zero, an infinitely large impedance is produced when the reactor 11A and the capacitor 12 are connected in parallel, and a great current limiting effect is provided. After the current is interrupted between the systems $S_1$ and $S_2$, the inductive energy stored in the reactor 11A and the capacitive energy stored in the capacitor 12 continue to flow as a circuiting vibration current through a closed circuit b-c-d which consists of reactor 11A, resistor 14A, closing device (CLD) 13 and capacitor 12. To convert this energy into heat energy and to radiate it, therefore, the resistor 14A must have a suitable resistance. When the resistor 14 has a zero resistance, furthermore, the inductive energy stored in the reactor 11 generates a surge voltage outside the current limiting device 1, for example, on the circuit breaker of the side of the system $S_1$ or $S_2$, and causes the circuit breaker to be subjected to stringent breaking duty. In order to convert the energy into heat energy and to radiate it in the current limiting device 1, therefore, the resistor 14 must also have a suitable resistance.

The current limiting device 1 which has been proposed thus far and which is shown in FIG. 1, is constructed and operates as mentioned above. This device, however, has the following defects:

(1) Two reactors are separately provided which makes the setup complex; and (2) Two resistors are separately provided which further makes the setup complex.

SUMMARY OF THE INVENTION

The present invention relates to an A-C current limiting device which is connected between different A-C systems, and isolates between the A-C systems in case an accident has developed, for limiting the flow of a transient current.

More particularly, such an A-C current limiting device has an intermediate terminal thereof, connected in series with a capacitor, a closing means and a resistor to one external terminal thereof, and has a connection terminal of said capacitor and said closing means, and the other terminal thereof connected to respective different A-C systems.

Therefore, high current limiting effect can be stably obtained with high reliability and with a simple structure.

BRIEF DESCRIPTION OF THE DRAWINGS

In the drawings, the same reference numerals denote the same or corresponding portions.

DESCRIPTION OF THE PREFERRED EMBODIMENT

Figure 1:
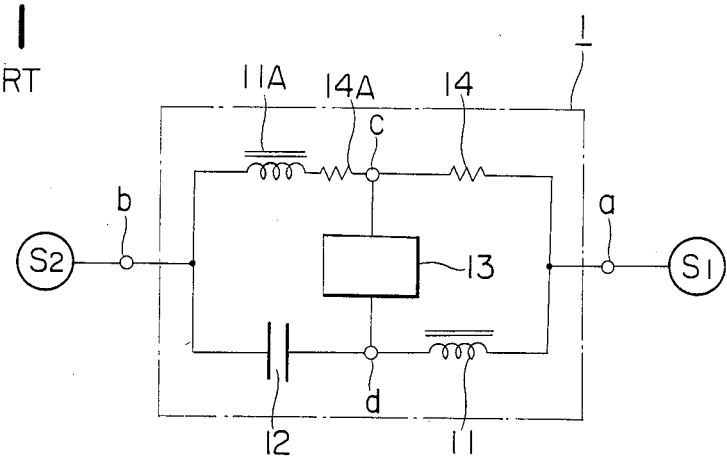
FIG. 1 is a diagram showing construction of a conventional current limiting device.
Figure 2:
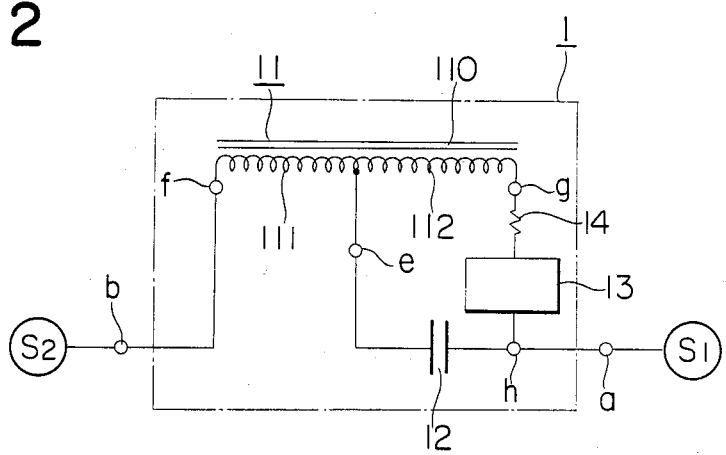
FIG. 2 is a diagram showing construction of a current limiting device according to an embodiment of the present invention.

An embodiment of the invention which is shown in FIG. 2 will be described below. In FIG. 2, the same portions as those of FIG. 1 are denoted by the same reference numerals.

The reactor 11 of the type of an autotransformer consists of a first winding 111 and a second winding 112 wound on a closed magnetic circuit 110, and has an intermediate terminal e and external terminals f, g. One terminal of the capacitor 12 is connected in series with the intermediate terminal e of the reactor 11. Between the external terminal g of the reactor 11 and the other terminal h of the capacitor 12, there are connected in series the resistor 14 and the closing means 13 which is in an open state under normal conditions and only conducts when an applied voltage thereacross exceeds a predetermined value. In FIG. 2, the thus constituted current limiting device is inserted for one phase between coupling points a, b of the two power systems $S_1$ and $S_2$.

Described below is the operation of the thus constructed embodiment of the present invention.

Under ordinary condition, the systems $S_1$ and $S_2$ have nearly the same potential, and the potential difference is small across the terminals g and h. Therefore, the closing device 13 remains in an open condition, whereby a series resonance circuit is formed by the first winding 111 and the capacitor 12 to perform resonance operation for the A-C frequency in the system. In this case, the resultant impedance of the series resonance circuit consisting of the first winding 111 and the capacitor 12 is close to zero, and the systems $S_1$ and $S_2$ coupled together.

In case an accident has developed, on the other hand, a heavy transient current flows into the systems $S_1$, $S_2$, and the potential difference increases suddenly across the terminals g and h. The closing device 13 therefore operates to electrically connect the terminals g, h together. Therefore, a parallel resonance circuit is formed by the second winding 112 of the reactor 11 and the capacitor 12, and the systems $S_1$ and $S_2$ are coupled together via a large impedance (the impedance increases infinitely if the resistance of resistor 14 is zero), so that excess current is limited from flowing between the systems $S_1$ and $S_2$.

The purpose of the resistance 14 will be described below.

If the resistance is zero, the resultant impedance of the current limiting device 1 becomes infinite, and a great current limiting effect is exhibited, as described earlier. When the defective current flowing between the systems $S_1$ and $S_2$ is limited by the current limiting device 1 and is then interrupted by a circuit breaker (not shown), however, the inductive energy stored in the first winding 111 and the second winding 112 of the reactor 11 as well as the capacitive energy stored in the capacitor 12 continue to flow as a circulating vibration current. This energy must be converted into heat in order to dissipate it. For this purpose, the resistor 14 must have a suitable resistance.

The principle of the current limiting device of the present invention will be described below with reference to FIG. 3 relying upon equations of complex numbers.

Figure 3:
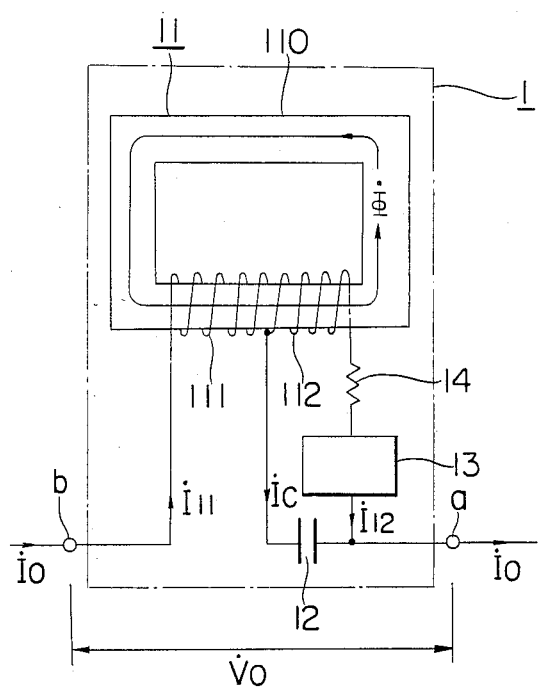
FIG. 3 is a diagram for illustrating the principle of the present invention.

As shown in FIG. 3, currents flowing into the first winding 111 and second winding 112 of the reactor 11, and into the capacitor 12, are denoted by $I_{11}$, $I_{12}$, $I_C$, the current flowing into the current limiting device 1 is denoted by $I_0$, the potential difference across the terminals a, b of the current limiting device is denoted by $V_0$, and the magnetic flux passing through the closed magnetic path 110 of the core of reactor 11 is denoted by $\Phi$. Then, the following Equation (1) holds in the current limiting device 1.

$$\dot{V}_0 = j\omega \cdot n_{11} \cdot \dot{\Phi} + \frac{\dot{I}_c}{j\omega \cdot C} \quad (1)$$

$$j\omega \cdot n_{12} \cdot \dot{\Phi} + \dot{I}_{12} \cdot R_x - \frac{\dot{I}_c}{j\omega \cdot C} = 0$$

$$\dot{I}_{11} \cdot n_{11} + \dot{I}_{12} \cdot n_{12} = \dot{\Phi} \cdot R_{mag}$$

$$\dot{I}_0 = \dot{I}_c + \dot{I}_{12}$$

$$\dot{I}_{11} = \dot{I}_0$$

where,
$\omega$: angular frequency of the power source of the system lines, $n_{11}$: number of turns of the first winding,
$n_{12}$: number of turns of the second winding,
C: capacity of the capacitor 12,
$R_x$: resultant resistance of the resistor 14 and the closing device 13,
$R_{mag}$: reluctance of the closed magnetic circuit of reactor 11.

From the above Equation (1), the impedance $Z_{ab}$ across the terminals a, b of the current limiting device 1 is given by the following Equation (2).

$$\dot{Z}_{ab} = \frac{\dot{V}_0}{\dot{I}_0} = \frac{jR_x \cdot \left( \frac{\omega \cdot n_{11}^2}{R_{mag}} - \frac{1}{\omega \cdot C} \right) + \frac{(n_{11} + n_{12})^2}{C \cdot R_{mag}}}{R_x + j\left( \frac{\omega \cdot n_{12}^2}{R_{mag}} - \frac{1}{\omega \cdot C} \right)} \quad (2)$$

When the system is under ordinary condition, the resultant resistance $R_x$ is infinite. If this condition is adapted to the Equation (2), the impedance $Z_{ab}$ is given by the following Equation (3).

$$\dot{Z}_{ab} \approx j\left( \frac{\omega \cdot n_{11}^2}{R_{mag}} - \frac{1}{\omega \cdot C} \right) \quad (3)$$

When the series resonance condition is established by the first winding 111 and the capacitor 12, i.e., when a relation $$\frac{\omega \cdot n_{11}^2}{R_{mag}} = \frac{1}{\omega \cdot C} \quad (4)$$

holds true, the impedance becomes, $$\dot{Z}_{ab}' \approx 0 \quad (5)$$

It will thus be recognized that the lines of the systems are coupled together with the resultant impedance of the current limiting device 1 being almost zero.

On the other hand, in an event an accident has occurred and a heavy transient current flows into the lines of the systems, the closing device 13 operates in this case, if the resistance of resistor 14 is zero, the resultant resistance $R_x$ becomes zero. From the Equation (2), therefore, the impedance $Z_{ab}$ is given by the following Equation (6).

$$\dot{Z}_{ab}'' \approx \frac{(n_{11} + n_{12})^2}{C \cdot R_{mag}} \cdot \frac{1}{j\left( \frac{\omega \cdot n_{12}^2}{R_{mag}} - \frac{1}{\omega \cdot C} \right)} \quad (6)$$

When the parallel resonance condition is established by the second winding 112 and the capacitor 12, i.e., when a relation $$\frac{\omega \cdot n_{12}^2}{R_{mag}} = \frac{1}{\omega \cdot C} \quad (7)$$

holds true, the impedance becomes, $$\dot{Z}_{ab}'' = \infty \text{ (infinite)}$$

That is, lines of the systems are coupled together via a very large resultant impedance produced by the current limiting device 1, and an excess current flowing into lines of the systems is limited.

Figure 4:
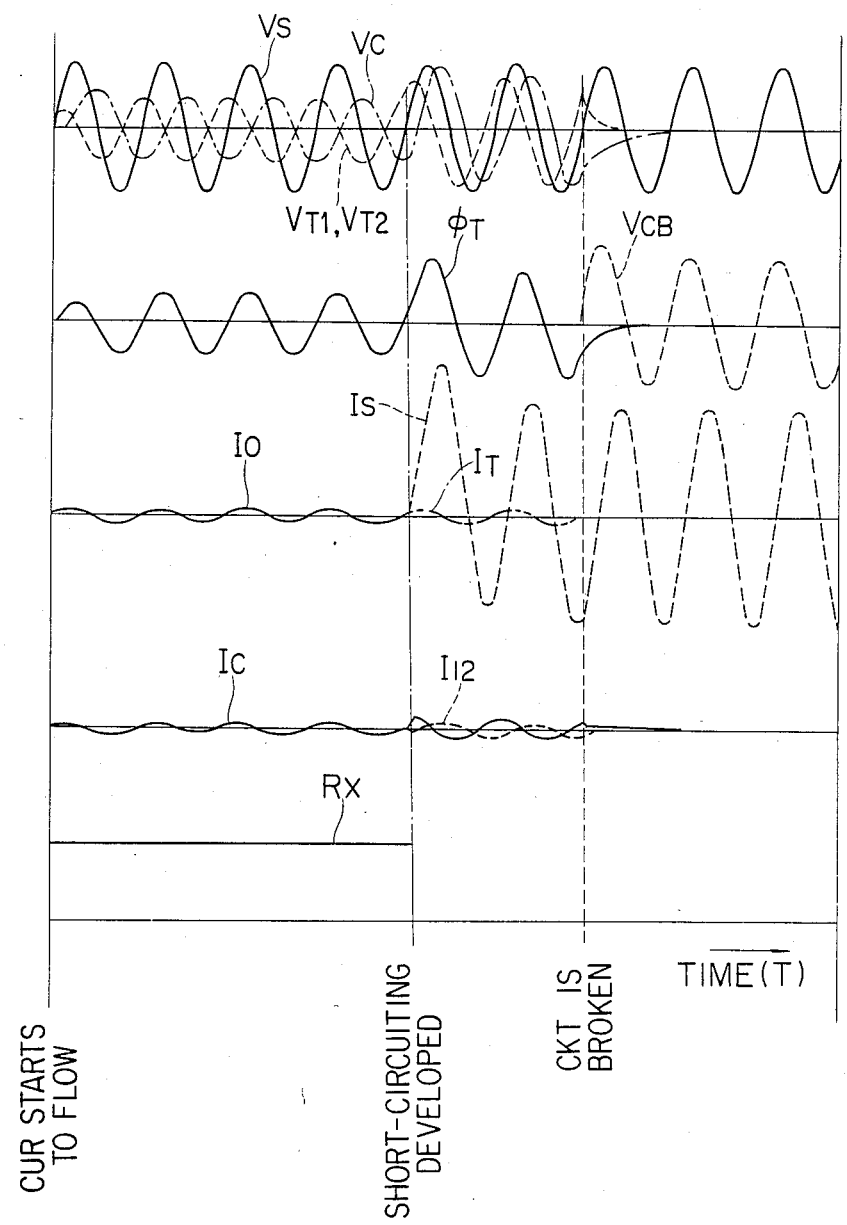
FIG. 4 is a diagram of waveforms for illustrating the characteristics of the current limiting device according to the present invention.

FIG. 4 illustrates the operation of the current limiting device according to the present invention, which is inserted in the lines of the systems. That is, FIG. 4 shows the transient state when a defective current caused by the occurrence of accident is interrupted. In FIG. 4, symbol $V_S$ denotes a voltage waveform of the power source of the lines of the system, $VT_1$ and $VT_2$ denote voltages across terminals of the first winding 111 and the second winding 112 of the reactor 11, $V_c$ denotes the voltage across the capacitor 12, $V_{CB}$ denotes a voltage across the electrodes of a circuit breaker (not shown), $\phi_T$ denotes a waveform of magnetic flux in the closed magnetic circuit 110 of the core of reactor 11, $I_0$ denotes a waveform of an electric current which flows under ordinary condition, $I_S$ denotes a waveform of short-circuit current that flows when the current limiting device 1 is not inserted, $I_T$ denotes a waveform of a current which is limited by the current limiting device 1, $I_C$ and $I_{12}$ denote waveforms of currents that flow into the capacitor 12 and the closing device 13, respectively, and $R_X$ represents change of resultant resistance of the resistor 14 and the closing device 13.

In addition to the excellent current limiting characteristics as will be obvious from the foregoing description, the current limiting device of the present invention provides the following effects:

1. The current limiting device resistive characteristics, and a transient state of the system is stabilized.

2. The electric energy stored in the first winding 111 and the second winding 112 of the reactor 11, and in the capacitor 12, is converted into heat energy and is radiated and, hence, the breaking duty for the circuit breaker is reduced (the electric energy in the first winding 111 is guided to the second winding 112 through the closed circuit 110 of the core, and is converted into heat energy in the resistor 14).

3. Compared with the conventional device of the type, only one reactor and one resistor are employed, enabling the current limiting device to be simply constructed as a whole.

What is claimed is:

1. A current limiting device comprising reactor means having first and second inductive windings connected directly together and having two external terminals and a common connection providing an intermediate terminal, a capacitor, a closing means and a resistor connected in series between said intermediate terminal and one of said external terminals of said reactor means, the other of said external terminals of said reactor means and the connection terminal of said capacitor to said closing means being respectively connected to different A-C systems, and means connecting said first winding and said capacitor to establish a series resonant circuit under ordinary operating conditions with said closing circuit open, and said second winding and said capacitor to establish a parallel resonant circuit in the event an accident has occurred and said closing circuit is operated.

2. A current limiting device as claimed in claim 1 wherein said closing means comprises a gap which is opened under normal conditions and only conducts when an applied voltage exceeds a predetermined value.

3. A current limiting device as claimed in claim 1 wherein said closing means comprises a contact element which is opened under normal conditions and only conducts when an applied voltage exceeds a predetermined value.

4. A current limiting device as claimed in claim 1 wherein said closing means comprises a semiconductor element which is opened under normal conditions and conducts only when an applied voltage exceeds a predetermined value.

5. A current limiting device as claimed in claim 1 wherein said closing means comprises a non-linear element which is opened under normal conditions and only conducts when an applied voltage exceeds a predetermined value.

6. A current limiting device as claimed in claim 1 wherein said reactor means comprises an autotransformer including said first winding and said second winding forming a closed magnetic circuit, said intermediate terminal is provided at a portion where said first winding and said second winding are connected in series, and said two external terminals are connected to said first winding and said second winding of said autotransformer, respectively.

7. A current limiting device comprising a reactor having an inductive coil of an autotransformer consisting of a first winding and a second winding wound to form a closed magnetic circuit, and having an intermediate terminal provided at a portion where said first winding and said second winding are connected in series, and two external terminals provided for said first winding and said second winding, respectively, a capacitor having a pair of terminals with one of said capacitor terminals connected to said intermediate terminal of said reactor, a series circuit comprising a resistor and a closing means connected between the other terminal of said capacitor and the external terminal of said second winding, one A-C system coupled to the external terminal of said first winding, another A-C system coupled to said other terminal of said capacitor, means connecting said first winding and said capacitor to establish a series resonant circuit under ordinary conditions, and means connecting said second winding, said capacitor and said closing circuit to establish a parallel resonant circuit in the event an accident has occurred in the A-C systems.

* * * * *